May 20, 1924.
F. E. SHIMONEK
TRACTOR DRIVE WHEEL
Filed May 16, 1922
1,494,383
2 Sheets-Sheet 1
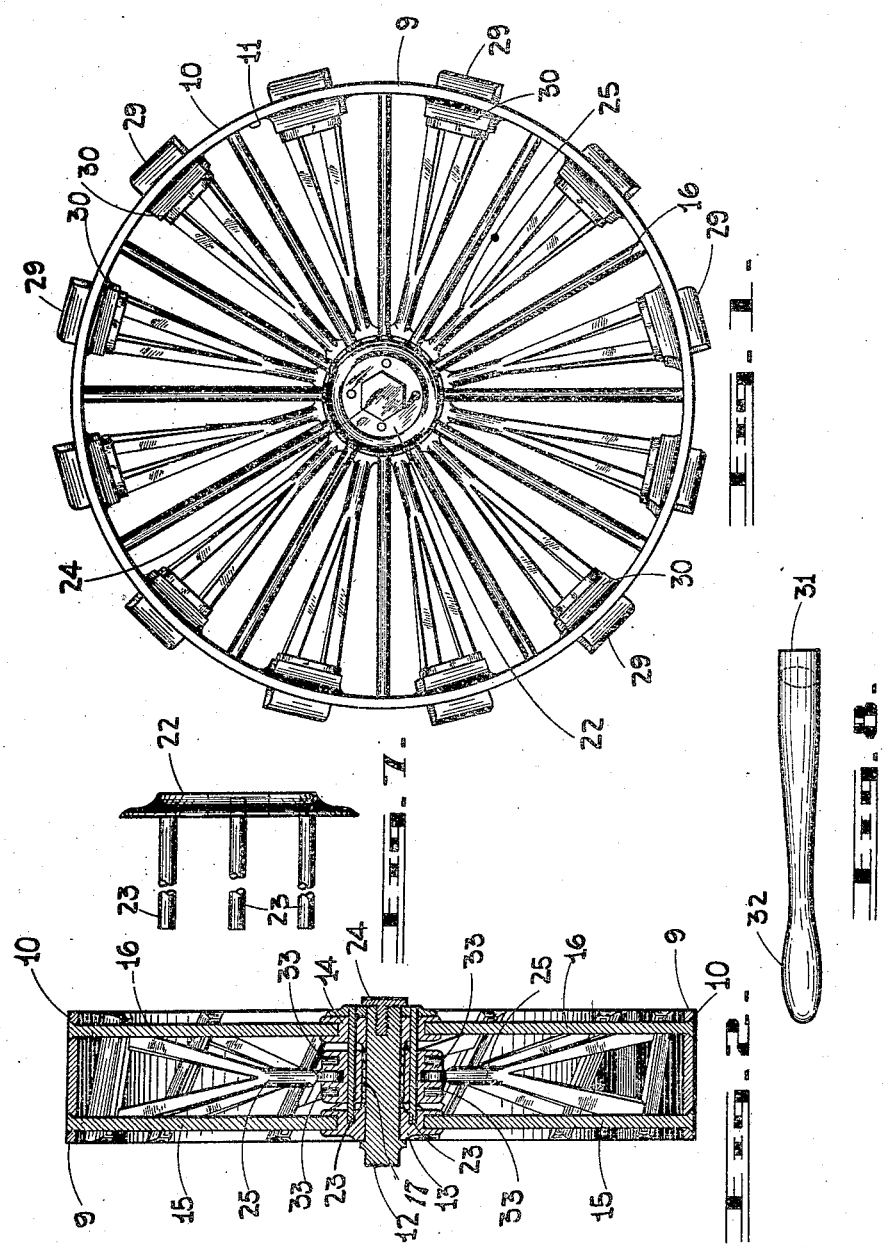
INVENTOR
FREDERICK E. SHIMONEK.
BY
ATTORNEY

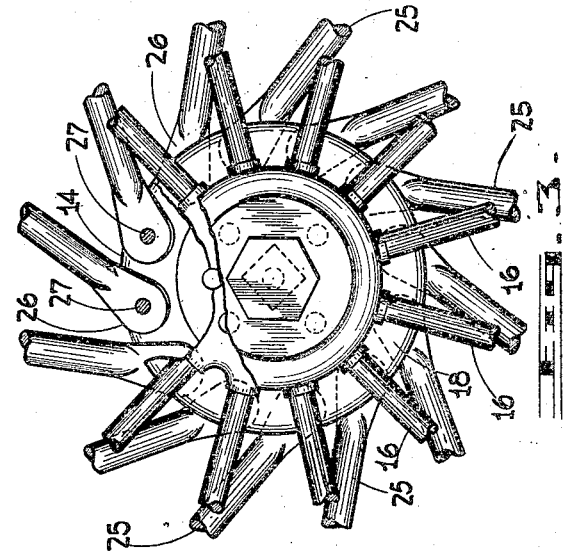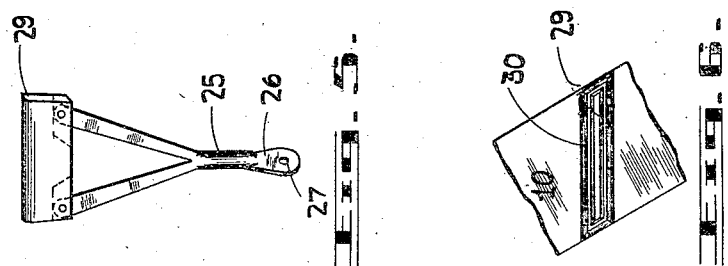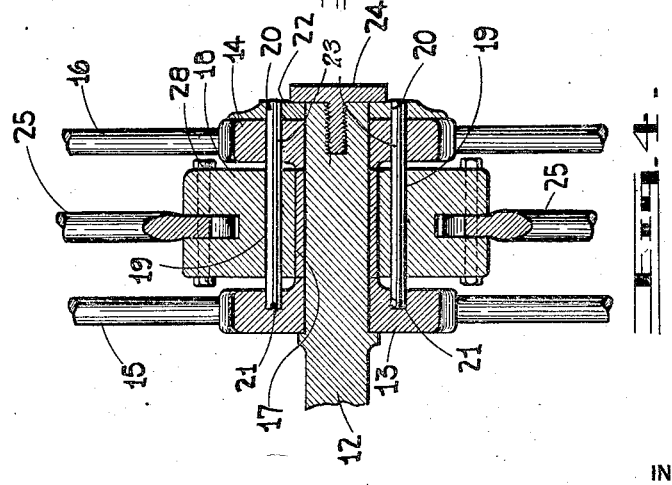

Patented May 20, 1924.

1,494,383

UNITED STATES PATENT OFFICE.

FREDERICK E. SHIMONEK, OF ST. JEAN BAPTISTE, MANITOBA, CANADA.

TRACTOR DRIVE WHEEL.

Application filed May 16, 1922. Serial No. 561,481.

*To all whom it may concern:*

Be it known that I, FREDERICK E. SHIMONEK, a citizen of the Dominion of Canada, residing at St. Jean Baptiste, in the county of Provencher and Province of Manitoba, Canada, have invented certain new and useful Improvements in Tractor Drive Wheels, of which the following is a specification.

The subject matter forming this application relates to tractor drive wheel construction adapted for use on conventional types of tractors.

The object of my invention is to provide a drive wheel having a plurality of gripping cleats disposed on the periphery thereof, which may be withdrawn from the periphery of the wheel when travelling over roads.

Among other aims and objects of my invention may be cited the provision of a traction drive wheel of the character described with a view to compactness and durability.

These and other objects I accomplish by means of such structure and relative arrangement of parts as will readily appear by a perusal of the following description, the descriptive matter being supplemented by the accompanying schematic illustrations, wherein:

Figure 1 is a side elevation of a tractor drive wheel constructed in accordance with my present invention.

Figure 2 is a medial vertical section of the tractor drive wheel shown in Figure 1.

Figure 3 is an enlarged fragmentary detail illustrating the connection of the spokes and cleat standards of the drive wheel.

Figure 4 is an enlarged medial vertical section further illustrating the connection of the spokes and cleat supporting standards of the drive wheel.

Figure 5 is an elevation of one of the cleats and cleat standards incorporated in my present invention.

Figure 6 is a plan of the cleat as it would appear from the periphery of the wheel.

Figure 7 is a fragmentary detail of the hub cap incorporated in my present invention and Figure 8 is a detail of the lever employed to extend or withdraw the adjustable cleats incorporated in my tractor drive wheel construction.

Referring to the drawings in detail, wherein like numerals of reference designate corresponding parts, the numeral 9 designates the rim of the wheel, 10 the outer periphery thereof and 11 the inner periphery thereof. The tractor drive wheel is carried by the rear axle 12 of the tractor through the medium of the hubs 13 and 14 and the plurality of spokes 15 and 16, which are seated in the hubs 13 and 14 and have their opposite extremities substantially seated in the rim 9 of the tractor drive wheel, best shown in Figure 2. The numeral 17 designates a bushing positioned about the axle 12 intermediate the hubs 13 and 14. This bushing keeps the said hubs in proper spaced relation.

The numeral 18 designates an adjustable collar rotatably mounted on the bushing 17. A plurality of apertures 19 are drilled transversely in the said collar, while a plurality of apertures 20 are drilled in the hub 14 in congruent spaced relation thereto. The numerals 21 designate a plurality of countersunk apertures disposed in the inner face of the hub 13. The hub plate 22 has a plurality of rods 23 extending therefrom, best shown in Figures 2 and 7. The said rods extend through the apertures 20 and 19 and seat in the countersunk apertures 21. Through the medium of the said rods, it will be discerned that the adjustable collar 18 may be held in the required position. The hub plate 22 is held in position by the cap screw 24.

A plurality of cleat standards, generally designated by the numerals 25, have their inner terminals flattened as at 26 and have the apertures 27 drilled therein. Bolts 28 extend through the adjustable collar 18 and through the said apertures 27. The opposite extremity of each standard 25 is bifurcated and has mounted on the outer extremity thereof a gripping cleat 29. The gripping cleats 29 are housed in the casings 30 formed on the said periphery 11.

When it is desired to withdraw the cleats 29 from the periphery 10 of the rim 9, the cap screw 24 is removed and the hub plate 22 and the rods 23 are withdrawn. It is obvious that the adjustable head 28 may be rotated on the bushing 17. The terminal 31 of the lever 32 is then inserted in one of the apertures 33 formed in the adjustable collar 18 intermediate the cleat standards 25. Through the medium of the lever 32, the adjustable head 18 is adjusted as required and the adjustable cleats 29 will be withdrawn from the periphery 10 of the rim 9.

In Figure 3, I have shown the position of the standards 25 as they would appear when the cleats 29 are withdrawn from the periphery 10 of the tractor drive wheel. When in this adjusted position, the rods 23 are inserted in the apertures 20 and 19 and the countersunk apertures 21, and the cap screw 24 positioned in the outer extremity of the axle 12, as diagrammatically illustrated. The adjustable head is turned the distance of space between the apertures 20.

A perusal of the foregoing description will substantiate that I have provided a very useful and durable tractor drive wheel. Since probably the best results may be obtained from the invention as disclosed, the construction of the same may well be followed, but within the scope of the invention as defined by the appended claim, minor changes may be made.

What I claim as new is:

In combination with a supporting axle, a tractor drive wheel comprising dual spaced hubs, a bushing intermediate said hubs, a collar rotatably carried on said bushing, a plurality of spokes carried by said dual hubs supporting a rim, a plurality of standards carried by said head, gripping cleats disposed on the outer extremities of said standards adapted to extend through said rim, housings for said cleats on the inner periphery of the rim, a set of oppositely registering openings in said hubs and said adjustable collar, a hub plate provided with a set of locking pins adapted to be seated in said openings when said collar is turned to extend or withdraw said cleats from said rim and a means of locking said hub plate in fixed position.

In testimony whereof, I affix my signature in the presence of two witnesses.

F. E. SHIMONEK.

Witnesses:
A. M. CAMPBELL,
A. R. McKAY.